US00H002239H

(19) United States
(12) Statutory Invention Registration
Campbell

(10) Reg. No.: US H2239 H
(43) Published: May 4, 2010

(54) CONE SUPPORT

(75) Inventor: Thomas Campbell, Concord, MA (US)

(73) Assignee: The United States of America as represented by the Secretary of the Navy, Washington, DC (US)

(21) Appl. No.: 12/284,474

(22) Filed: Sep. 22, 2008

(51) Int. Cl.
*A47G 29/00* (2006.01)

(52) U.S. Cl. ..... 248/688
(58) Field of Classification Search ..... 248/688
See application file for complete search history.

(56) References Cited

U.S. PATENT DOCUMENTS

| | | | |
|---|---|---|---|
| 4,903,851 | A | 2/1990 | Slough |
| 5,085,389 | A | 2/1992 | Levesque |
| D521,858 | S | 5/2006 | Roy |

OTHER PUBLICATIONS

McMaster–Carr Supply Company, Catalog 106, p. 2836.

*Primary Examiner*—Michelle Clement
(74) *Attorney, Agent, or Firm*—Mark O. Glut

(57) ABSTRACT

A cone support for use with a stud, the cone support includes a hollow truncated cone with an apex and a base. The hollow truncated cone includes an apex aperture disposed at the apex and a base aperture disposed at the base. The apex aperture has a threaded internal diameter. The apex aperture and base aperture communicate within a cone chamber, the cone chamber is disposed within the interior of the cone and between the apex aperture and the base aperture. The stud is placeable within the apex aperture, the cone chamber and the base aperture such that the cone support protects the stud from shear forces when the stud is stressed perpendicular to its axis.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONE SUPPORT

STATEMENT OF GOVERNMENT INTEREST

The invention described herein may be manufactured and used by or for the Governmental of the United States of America for government purposes without payment of any royalties thereon or therefor. The technology described herein was a subject invention under contract No. N00421-03-P-0049 with Foster-Miller, Inc.

BACKGROUND

The present invention relates to a cone support. More specifically, but without limitation, the present invention relates to a cone support for protecting a stud, particularly a bonded stud, from shear forces when the stud is stressed perpendicular to its axis.

Prior to the present invention, threaded studs with a flanged base plate were used to fasten items to a surface via bonding the flanged plate. The flanged studs failed in sided load through shear or fatigue over time.

For the foregoing reasons, there is a need for a conical support for a use with a stud.

SUMMARY

The present invention is directed to a cone support that meets the needs enumerated above and below.

The present invention is directed to a cone support for use with a stud, the cone support includes a hollow truncated cone with an apex and a base. The hollow truncated cone includes an apex aperture disposed at the apex and a base aperture disposed at the base. The apex aperture has a threaded internal diameter. The apex aperture and base aperture communicate with a cone chamber, the cone chamber is disposed within the interior of the cone and between the apex aperture and the aperture. The stud is placeable within the apex aperture, the cone chamber and the base aperture such that the cone support protects the stud from shear forces when the stud is stressed perpendicular to its axis.

It is a feature of the present invention to provide a cone support that adds strength, but minimal weight to a system.

DRAWINGS

These and other features, aspects and advantages of the present invention will become better understood with reference to the following description and appended claims, and accompanying drawings wherein:

DESCRIPTION

Figure 1:
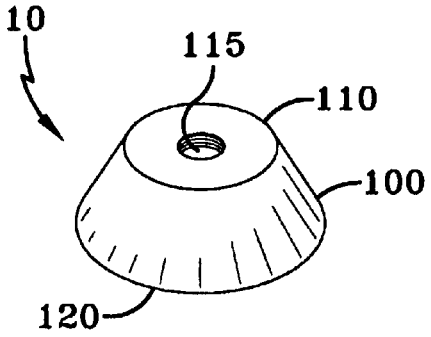
FIG. 1 is a top perspective view of an embodiment of the cone support.
Figure 2:
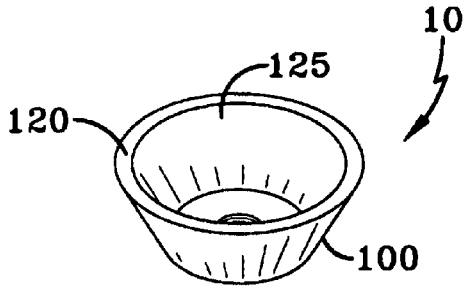
FIG. 2 is a bottom perspective view of an embodiment of the cone support.

The preferred embodiment of the present invention are illustrated by way of example below and in FIGS. 1–6. The cone support 10 includes a hollow truncated cone 100 with a flattened apex 110 and a base 120. A flattened apex 110 may be defined as the top of a frustum or the top area left when an apex of a typical cone is cut at a parallel plane to the base. The hollow truncated cone 10 includes an apex aperture 115 disposed at the flattened apex 110 and a base aperture 125 disposed at the base 120. The apex aperture 115 has a threaded internal diameter 116. The apex aperture 115 and the base aperture 125 communicate with a cone chamber 105, the cone chamber 105 is disposed within the interior 106 of the cone 10 and between the apex aperture 115 and the base aperture 125. A stud 50 is placeable within the apex aperture 115, the cone chamber 105 and the base aperture 125 such that the cone support 10 protects the stud 50 from shear forces when the stud 50 is stressed perpendicular to its axis 51.

In the description of the present invention, the invention will be discussed in an avionic or aeronautics environment; however, this invention can be utilized for any type of need that requires use of a cone support.

Figure 3:
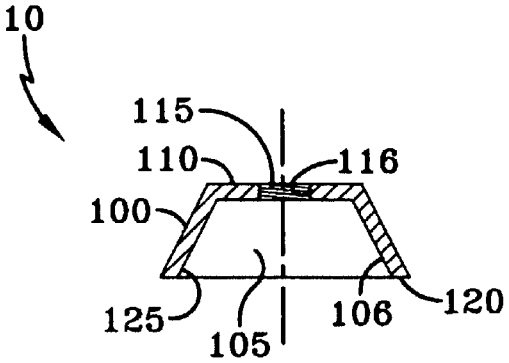
FIG. 3 is a cross sectional view of an embodiment of the cone support.
Figure 4:
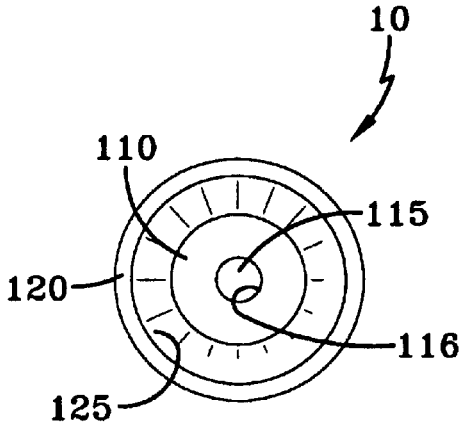
FIG. 4 is a bottom view of an embodiment of the cone support.
Figure 5:
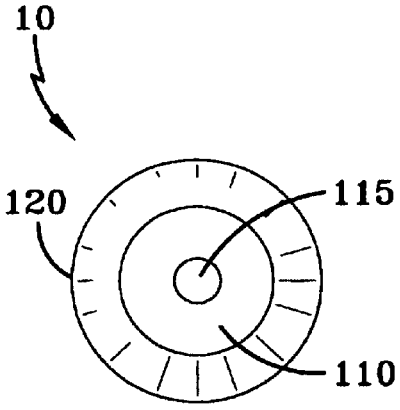
FIG. 5 is a top view of an embodiment of the cone support.
Figure 6:
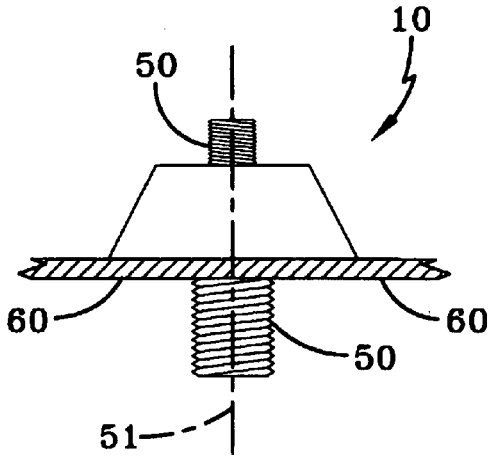
FIG. 6 is a side view of a cone support is use.

As shown in FIGS. 3 and 4, the base aperture 125 is larger than the apex aperture 115. In use, the base 120 of the cone support 10 is in contact with a stud flange 60. The walls of the cone may be thin, and the cone may be manufactured from metal, plastic, composite or any type of material practicable.

The cone size and wall thickness can be scaled to suit expected loads. The cone support 10 is used with a threaded stud with a flared base embedded within a tapered composite base. The bottom of the base of the stud is flat and placed against the part. The bottom of the base of the stud is bonded to the part. In operation, the cone support is threaded to the stud via the threaded internal diameter 116, and may be bonded to the flared base of the stud via the base 120.

When introducing elements of the present invention or the preferred embodiment(s) thereof the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiment thereof, other embodiments are possible. Therefore, the spirit and scope of the appended claims should not be limited to the description of the preferred embodiment(s) contained herein.

What is claimed is:

1. A cone support for use with a stud, the cone support comprising:

a hollow truncated cone having an apex and a base; the hollow truncated cone having a apex aperture disposed at the apex and a base aperture disposed at the base, the apex aperture having a threaded internal diameter, the apex aperture and the base aperture communicate with a cone chamber, the cone chamber disposed within the interior of the cone, the stud placeable within the apex aperture, the cone chamber and the base aperture such that the cone support protects the stud from shear forces when the stud is stressed perpendicular to its axis.

2. The cone support of claim 1, wherein the base aperture has a larger diameter than the apex diameter.

* * * * *